Figure 2:
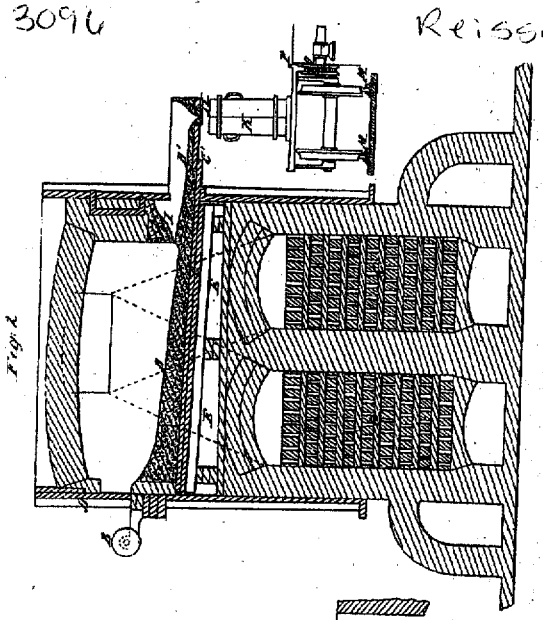

E. & P. E. Martin.

Refining Cast Iron.

No. 3096 Reissued Aug. 25, 1868

Witnesses.
[illegible]
[illegible]

Inventor
Emile Martin Jr.
Pierre Emile Martin
by their attorney
[illegible]

N. PETERS, PHOTO-LITHOGRAPHER, WASHINGTON, D. C.

UNITED STATES PATENT OFFICE.

EMILE MARTIN AND PIERRE E. MARTIN, OF PARIS, FRANCE.

IMPROVED PROCESS FOR REFINING AND CONVERTING CAST-IRON INTO CAST-STEEL AND OTHER COMBINATIONS OF IRON AND CARBON.

Specification forming part of Letters Patent No. 72,061, dated December 10, 1867; Reissue No. 3,096, dated August 25, 1868.

*To all whom it may concern:*

Be it known that we, EMILE MARTIN and PIERRE EMILE MARTIN, of Paris, in the Empire of France, have invented a new and Improved Process for Refining and Converting Cast-Iron and Cast-Steel, and other combinations of iron and carbon; and we hereby declare the following to be a full, clear, and exact description of the same.

Our object in this invention is to manufacture on the bed of a reverberatory furnace, by a certain process hereinafter described, cast-steel, and other combinations of iron and carbon, of a better quality than can be produced by the processes now in use for producing steel on a large scale, effecting at the same time a greater economy in the manufacture or production of the said metals. This process of manufacture, in affording the means of graduating the proportions of the materials, and of varying the quality of the same during the fusion, admits of the following products being obtained: Hard cast-steel, fitted for the fabrication of cutting-tools, &c.; soft cast-steel,(called "homogeneous metal,") capable of being welded and wrought or tilted when heated, and of being drawn when cold; cast wrought-iron possessing the resistance or tenacity of wrought-iron without being subjected to hammering or rolling; mixed metal adapted to take the place of ordinary cast-iron in many cases for moldings or castings, by reason of being better able to withstand concussion or shock.

Our process is based partly on the fact that when heated pieces of wrought-iron or steel, or oxide of iron, are added to a bath of cast-iron maintained at a temperature equal or nearly equal to the melting-point of wrought-iron, the carbon contained in the melted cast-iron and in the steel, if steel be used, is readily disassociated from the metal, and the whole mass of molten metal passes to the condition of molten malleable or wrought iron without any working, such as is required in the process of puddling, the decarbonization being effected by the addition of only a moderate quantity of malleable iron or steel, or oxide of iron, or suitable ore; and our said invention consists in so decarbonizing until all or nearly all the carbon shall have been separated from the iron, and then adding to the molten mass the required quantity of cast-iron or other recarbonizing or "deoxygenating" material, to bring the mass to the desired degree of carbonization, according to the grade of steel required to be produced.

The economy of our process of refining results from the simplicity of the operation for reducing the metal to ordinary cast-steel, homogeneous metal capable of being substituted for wrought or forged iron, with all the advantages which result from its fusibility, or to other combinations of iron and carbon.

The refining can be conveniently accomplished in the course of several hours by meltings or fusions of from three to five tons. Under our process we can run in cast-steel, homogeneous-metal, cast wrought-iron, or mixed-metal castings of the greatest weight at a single pouring by employing one or more furnaces.

Our process consists in first forming on the bed of a reverberatory furnace, (preferably the Siemens furnace,) to which a basin-like shape is given, a bath of cast or pig iron, which is brought to a high temperature. When the bath has been thus heated ore is thrown in, either roasted, or preferably roasted and cemented, in small pieces of about from twenty to fifty pounds in weight; or there may be thrown in pieces of puddled iron or steel, granulated iron, old rails, or scrap-iron, which should previously be brought to a clear red or yellow white heat in an adjoining furnace, or in a compartment in the reverberatory furnace provided for the purpose. The ore also should be subjected to a preliminary heating before being put into the bath.

The temperature of the furnace during the whole operation is to be constantly maintained at a temperature near the melting-point of wrought-iron, and the flame kept at the proper point of intensity.

The addition of the ore or pieces of iron, steel, &c., is made at intervals of about twenty minutes, in charges of from two hundred to four hundred pounds, according to the size of the preliminary bath of cast-iron.

The quality of the material, or the degree to which the bath has been refined, may be determined by a "proof"—that is to say, by a quantity of about one pound, which is taken from the bath in a ladle and run into a small ingot-mold.

When the bath has been refined to the point where it approaches the state of melted wrought-iron there is added to it a quantity of cast or pig iron, preferably manganiferous or specular iron, (spiegeleisen,) or other suitable recarbonizing or deoxygenating material.

The proportions of these substances added at the conclusion of the operation are to be varied at the will of the workman, according to the quality of his proof and the nature of the metal which he desires to obtain.

In proportion as the operation of running is delayed after the fusion of the last-added material, the bath becomes more and more soft—a fact which gives great facility in obtaining exactly the hardness required.

Under our invention there are two stages in the operation, each of which is well defined, and possesses characteristics of its own: First, the refining process by the addition of iron or ore or puddled steel; second, the return of the bath to the point desired and sought for by means of the addition of cast-iron, or other recarbonizing or deoxygenating material.

By varying the doses we obtain the products hereinbefore named, thus:

1. *Mixed metal.*—Proportions of the charge: Preliminary bath of seventeen hundred pounds of gray pig-iron; addition of twenty-five hundred pounds of iron, steel, or any kind of scrap-iron, (the proportion of the iron is to be diminished with the addition of ore, and should vary with the nature or quality of the cast-iron itself,) and final addition of thirteen hundred pounds of cast-iron at the end of the operation, or the equivalent of other carbonizing material.

The product may be rolled or drawn without cracking, and cut at a cherry-red heat with the chisel without being "red-short." Bars and castings of this material will be without bubbles. A prolonged annealing softens the castings run in mixed metal, and finally completely transforms them into malleable cast-iron.

In order to render the bath entirely homogeneous, a charge or two of iron or ore is reserved for the close of the operation, and the bath is stirred for some moments before running. Duration of the operation, about five hours.

2. *Steel for tools.*—Proportions of charge: Preliminary bath of seventeen hundred pounds of gray pig; addition of about twenty-eight hundred pounds of steel puddled from the same pig; final addition of from four to five hundred pounds of specular cast-iron (spiegeleisen.) Length of operation, about six hours.

According to the quality of the cast or pig iron employed, the proportion of the different materials employed should be varied as low as two parts of cast-iron and one part of the puddled steel and iron with four hundred-weight of ore.

3. *Homogeneous metal or soft cast-steel.*—This metal can be subjected, like iron, to the operations of tempering, welding, and sweating, and can be worked readily at all temperatures without being red-short.

Proportions of charge: thirteen hundred pounds of specular cast-iron, (spiegeleisen;) twenty-two hundred pounds of granulated soft iron or puddled steel from the same pig; two to three hundred pounds of the same cast-iron at the close of the operation, or the equivalent proportion of other recarbonizing or deoxygenating material. Duration of the operation, about seven hours.

4. *Cast wrought-iron.*—This is a metal which, when formed into castings, has, without being forged, about the resistance or tenacity of wrought-iron. It presents the same species of fracture, and can be rolled and worked at a red or white heat, welding like iron.

The refining by the fusion of scrap-iron or puddled steel in the bath or by the use of ore, either by itself or mixed with scrap-iron or puddled steel, is carried to the maximum point. As in the preceding operations, so in this case there is added at the close of the operation about five per cent. of silicious and manganiferous gray or specular pig-iron. The proportion of five per cent. is augmented as far as twenty per cent. with gray pig made with charcoal or wood, certain qualities of which metal are refined rapidly, and without being stirred, by the effect alone of the high temperature of the cast-iron bath already obtained. Duration of the operation, from six to seven hours.

The following is an instance of the production of cast-steel with a large proportion of cast-iron: Twenty hundred-weight of cast-iron, eight hundred-weight of scrap-iron, four hundred-weight of ore, and eight hundred-weight of cast-iron at the close of the operation, or an equivalent proportion of other recarbonizing or deoxygenating material.

The following are the proportions of the respective materials when cast-iron and ore are alone employed: Twenty hundred-weight of cast-iron; six hundred-weight of roasted manganiferous and oxidated ore. Cast-iron added at the close of the operation: two hundred-weight for cast wrought-iron; eight hundred-weight for cast-steel; twelve hundred-weight for mixed metal. Cast-iron granulated or treated according to the processes of Uchatius, Rostaing, or others, may, as above indicated, be also employed. In the above instance, the oxidated cast-iron assists in the refining. Cast-iron amalgamated previously by fusion with ore serves the same purpose.

Figure 1:
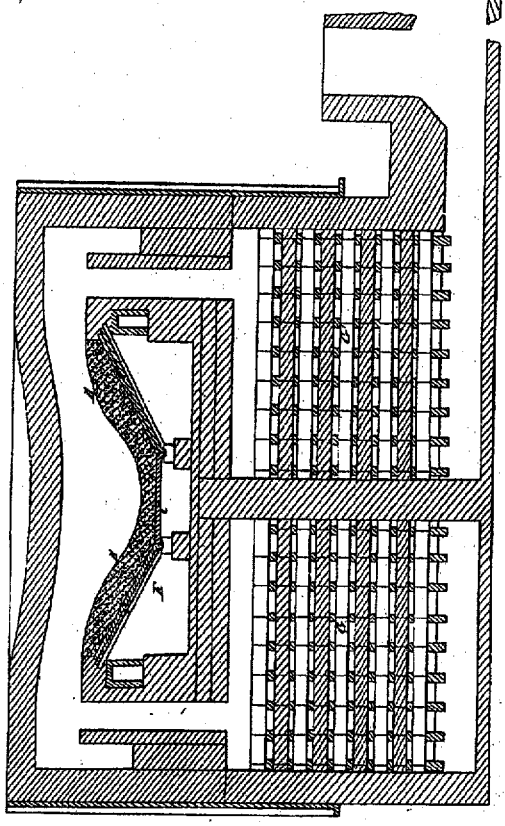

In the drawings accompanying this specification, Figure 1 represents a longitudinal section, and Fig. 2 a transverse section, of our melting-furnace, operating in accordance with the Siemens system.

At A is the door at which the furnace is charged, by means of a suitable tool, which slides on a roller, B. On the cast-iron plates C of the furnace is spread a bed of sand, D, upon which the metal-bath rests. Below the bed C is an empty space, which is intended to receive air, vapor, or spray, for the purpose of cooling the plates. The running or drawing off of the metal-bath takes place through the hole H. When it is desired to draw off the metal, the hole I in the furnace is tapped by suitable means, well known to those skilled in the art to which this invention pertains. The metal, in a fused state, passes through the hole I, and falls from the opening H into one of the receptacles K, mounted on a truck, which is moved upon the rails M M by means of a pinion, O, and rack P.

Having thus described our improved process, and the mode of working the same, and pointed out the various modifications thereof which we have contemplated, we desire it to be understood that we do not limit our claim of invention to the use of the precise materials and proportions named in the examples specified, as these may be varied within the compass of our invention.

We are aware that it has been proposed to make steel by melting together wrought and cast iron, either in a crucible or on the hearth of a reverberatory furnace, and sometimes to add scrap-steel during the operation, and therefore we do not wish to make claim to such process; but all those who have proposed or tried to make steel in this way have acted on the idea that by adding, in suitable proportions, wrought-iron which contains no carbon, or a very slight trace of it, to cast-iron which contains carbon in excess, a compound would be produced containing the required proportion for steel of the various degrees of hardness required, and directions have been given for determining when the proper degree of decarbonization shall be reached. Steel so produced has always been of inferior quality, as it works what is termed "red-short" under the hammer, and, moreover, is wanting in homogeneity of the grain, and although good specimens may occasionally have been produced by such process, it has failed to produce practical results.

What we claim as our invention, and desire to secure by Letters Patent, is—

The process, substantially as herein described, for decarbonizing cast-iron, in combination with the process of recharging the molten metal with the recarbonizing or deoxygenating material, substantially as and for the purpose specified.

EMILE MARTIN.
PIERRE E. MARTIN.

Witnesses:
F. OLCOTT,
DAVID T. S. FULLER.